United States Patent [19]

Schilke et al.

[11] 4,455,001
[45] Jun. 19, 1984

[54] TAPE TRANSPORT CARTRIDGE

[75] Inventors: David C. Schilke, Middletown; Paul D. Dringoli, Wallingford, both of Conn.

[73] Assignee: Raymond Engineering Inc., Middletown, Conn.

[21] Appl. No.: 365,341

[22] Filed: Apr. 5, 1982

Related U.S. Application Data

[63] Continuation of Ser. No. 850,791, Nov. 11, 1977, abandoned.

[51] Int. Cl.³ .......................... G03B 1/04; G11B 15/32
[52] U.S. Cl. ..................................... 242/192; 242/67.5
[58] Field of Search ...................... 242/76, 75.1, 67.5, 242/192, 75.2; 360/69, 74.7, 90, 93; 226/198

[56] References Cited

U.S. PATENT DOCUMENTS

| | | | |
|---|---|---|---|
| 2,706,638 | 4/1955 | Bruderlin et al. | 360/74.7 |
| 3,620,473 | 11/1971 | Stone | 242/192 |
| 3,625,456 | 12/1971 | Harkins | 242/192 |

Primary Examiner—Leonard D. Christian
Attorney, Agent, or Firm—David S. Fishman

[57] ABSTRACT

A tape transport cartridge is presented wherein the rotational kinetic energy of the two reels and tape packs are balanced, constant tension on a drive belt is effected by a counterbalanced idler roller assembly, and a temperature compensated brake acting on the drive belt contributes to achieving a stable tape pack over a wide temperature range.

18 Claims, 6 Drawing Figures

TAPE TRANSPORT CARTRIDGE

This is a continuation of application Ser. No. 850,791, filed Nov. 11, 1977 and now abandoned.

BACKGROUND OF THE INVENTION (1) Field of the Invention

The present invention relates to tape transports and particularly to apparatus for causing movement of a magnetic recording tape relative to a recording and/or playback head. More specifically, this invention is directed to a hermetically sealed tape transport cartridge which minimizes the error rate of a magnetic tape system employed to store one or more programs, sets of instructions or other digital data.

(2) Description of the Prior Art

Tape transport mechanisms are, of course, well known in the art. Tape transports of the same general type as that to which the present invention is directed are exemplified by the apparatus disclosed in U.S. Pat. Nos. 3,620,473 and 3,974,982 which are assigned to the assignee of the present invention. A tape transport will typically include a tape handling mechanism, a magnetic tape on which a program may be stored, a read/write head and a drive motor. It is, of course, essential that the tape transport operate with very low error rate.

In the interest of minimizing error rate, the tape and transport parts must be maintained in a clean and dry state. Dirt will cause dropout errors on the tape. A high moisture content in the air, combined with a warm temperature, will cause deterioration of both the head and tape leading to rapid wear-out and an increasing error rate. If humid air is trapped within the unit, cooling can cause condensation of moisture on the tape and other parts, also leading to deterioration and continued cooling can cause freezing of the condensed moisture. Any ice which forms may cause the tape to separate from the head or may cause the mechanism to fail to drive. Thus, to permit use in a wide variety of environments, a tape transport should be suitable for hermetic sealing. Most prior tape transports have been belt or gear driven from a "remotely" located motor and thus hermetic sealing has been difficult.

Several mechanical and/or dynamic problems have also been encountered in some of the prior art. A typical arrangement may have a spring loaded idler to apply tension to a peripheral drive belt; and vibration forces may vary the load of the idler. Additionally, tape spillage resulting from unequal rates of acceleration and deceleration of the supply and take-up reels of a tape transport has been a prevalent prior art problem as has rotation of one reel with respect to the other, especially when power is suddenly removed from the drive motor.

Another deficiency of some prior art tape transports has resided in the fact that they have not provided for compensation for dimensional changes encountered when operating over a wide temperature range. Stability of operation over a wide temperature range is also essential to minimizing the error rate.

In high speed applications, the dangers of possible spillage or tape overstressing become acute. A particular and previously unsolved problem resides in the imbalance between the rotational kinetic energy of the supply and take-up reels. As a result of this imbalance, which varies as a function of the amount of tape on each reel at any instant, one reel of a tape transport will typically react faster or slower than the other thereby causing excess tension or slack. The tension stresses can, if sufficiently severe, cuase breaking of the tape; while slack may at the very least result in the movement of the tape away from the head thus causing an error.

SUMMARY OF THE INVENTION

The present invention overcomes or reduces the problems of the prior art with a hermetically sealed tape transport cartridge. The drive motor forms a part of the cartridge, so the unit is effectively sealed against environmental problems and requires only electrical connections to operate. The mechanical and/or dynamic problems of the prior art are addressed by features such as: reels and tape packs which are in substantial rotational kinetic energy balance; a dynamically balanced idler to apply tension to the peripheral drive belt; and a temperature compensated rotary brake acting on the drive belt which, in conjunction with the elastic characteristics of the drive belt, is effective to maintain a relatively constant tape tension over a wide temperature range.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
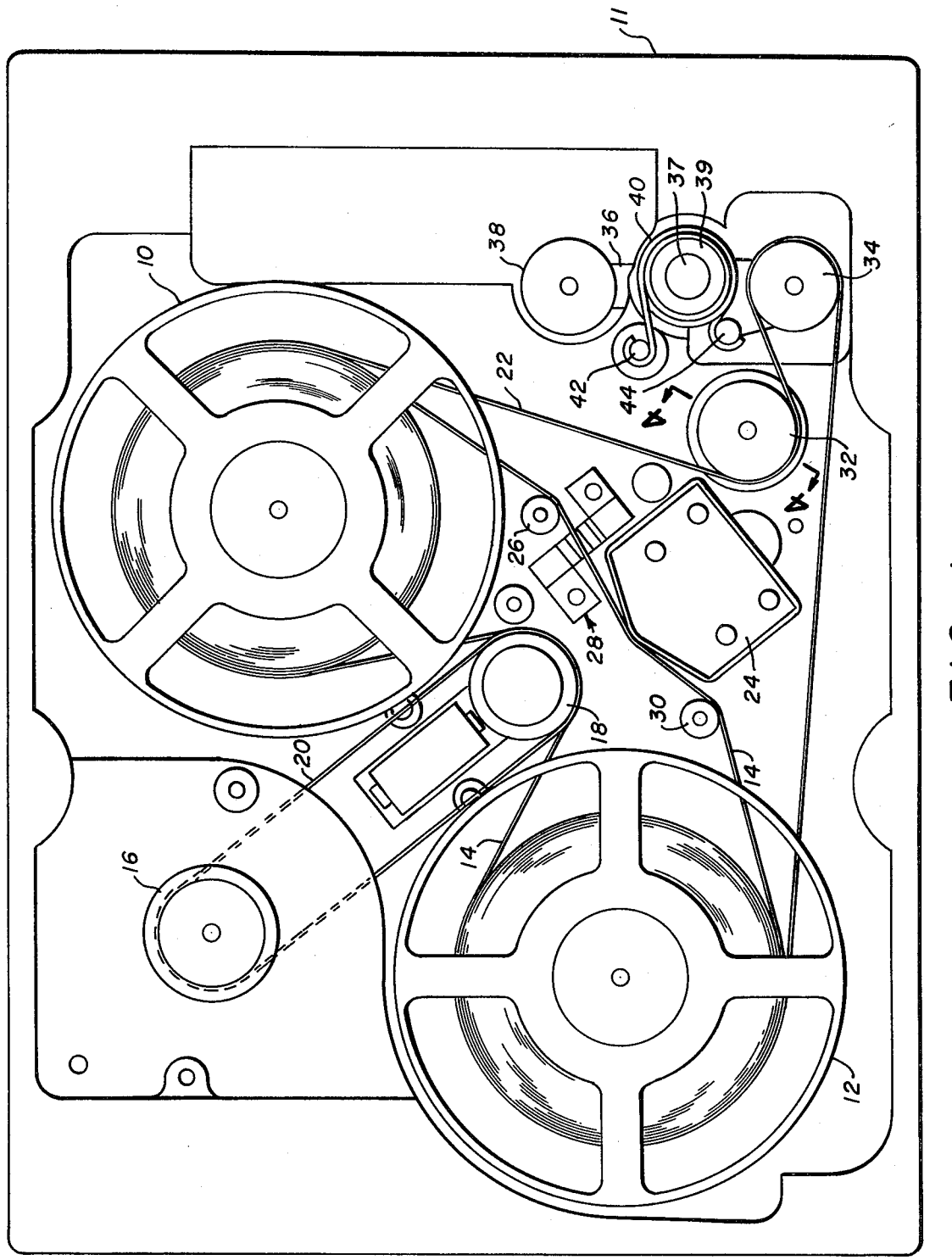
FIG. 1 is a top plan view of a tape transport in accordance with a preferred embodiment of the present invention, with the top cover removed.
Figure 3:
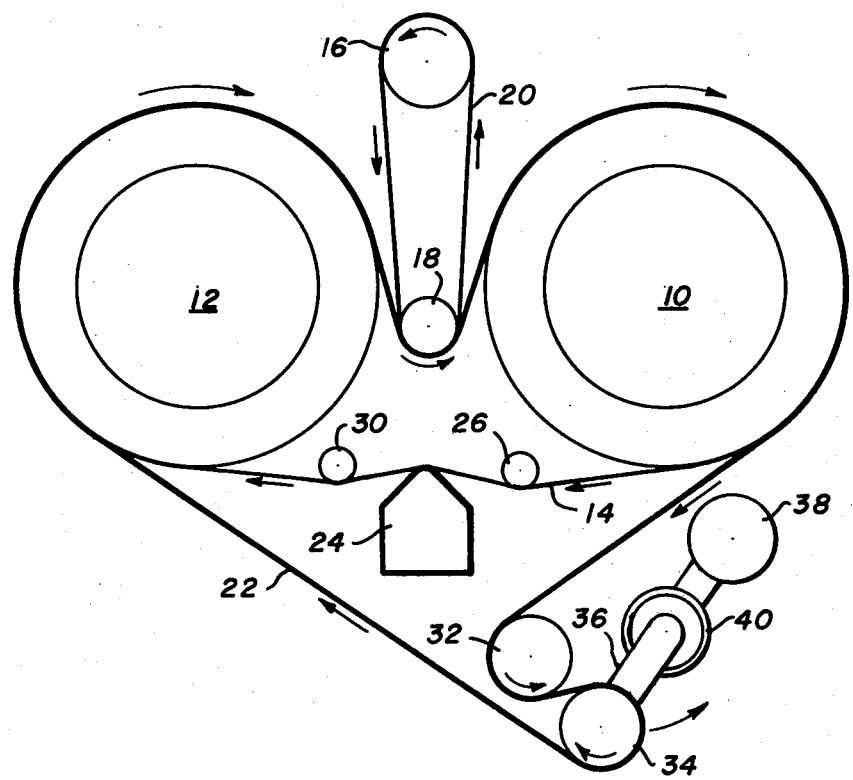
FIG. 3 is a schematic representation of the tape transport of FIG. 1.

Referring jointly to FIGS. 1 and 3, a tape transport unit in accordance with a preferred embodiment of the present invention is shown, FIG. 3 schematically diagraming the path of the recording tape and the drive belts. In the tape transport of FIGS. 1 and 3, the recording tape is contained in two reels 10 and 12 rotatably mounted on a cartridge base 11. Depending on the direction of tape motion, one reel will function as a supply reel while the other reel acts as a take-up reel. As shown in FIG. 3, reel 10 is functioning as the supply reel while reel 12 is functioning as the take-up reel. Each of reels 10 and 12 is affixed to a precision ball bearing mounted shaft which permits reel rotation. In accordance with the present invention, no drive or braking power is transmitted to either of the reels via the free turning reel shafts.

The tape transport of FIGS. 1 and 3 includes, in addition to the reels 10 and 12, a magnetic tape 14 which is transferred between the reels, a drive motor 16 and a rotatable capstan 18 mounted on cartridge body 11 and a drive belt 20 which couples motor 16 to capstan 18 whereby the motor will drive the capstan. The tape transport also includes a peripheral belt 22 which extends over capstan 18 and about the periphery of the tape packs on reels 10 and 12 as may best be seen from FIG. 3. The tape transport also includes a read/write head 24 and various tape guides and rollers which will be described below.

The path for the recording tape 14, presuming that reel 10 is functioning as the supply reel, is from the periphery of reel 10 across a first tape guide 26 and through a photoelectric beginning of tape (BOT) end of tape (EOT) sensor which has been indicated generally at 28. Thereafter tape 14 passes across the working gap of the head assembly 24, across a second tape guide 30 and onto the periphery of the tape pack on take-up reel 12. It should be noted that the only transport element which contacts the tape oxide surface outside of the tape packs is the working gap surface of the read/write head 24. The back side of the tape, rather than the oxide surface, will contact the tape guides 26 and 30. The absence of extra transport elements in contact with the tape oxide surface helps minimize oxide wear and thus prolongs tape life. It is also to be noted that the BOT/EOT sensor 28 has been omitted from FIG. 3 in the interest of facilitating understanding of the present invention.

The path for the endless peripheral driving belt 22, which is preferably a seamless plastic film material such as a polyimide film such as Kapton or a polyester film such as Mylar, is about part of the periphery of the tape pack on reel 10, about a temperature compensated rotary brake 32, around a belt tensioning idler roller 34, around a portion of the periphery of the tape pack on reel 12, about capstan 18 and back to its starting point on the tape pack on reel 10. The belt tensioning idler roller 34 is rotatably mounted on a shaft on a first end of a spring-loaded arm 36, and a counterweight 38 is mounted on the opposite end of arm 36. Arm 36 is mounted on a rotatable shaft 37 which is mounted in bearings in housing 39 in base 11. The spring for tensioning arm 36 is indicated at 40. Spring 40 is a torsion spring which has one end grounded at post 42 to base 11 and the other end of spring 40 attached to a post 44 on arm 36, and the body of spring 40 is coiled around housing 39. Spring 40 serves to maintain a substantially constant tension on belt 22 as the tape 14 travels from beginning of tape to end of tape by urging arm 36 and idler roller 34 in the direction to impose a tension load on belt 22. The counterweight 38 serves to dynamically balance arm 36 to prevent variations in the tension of belt 22 which would otherwise result from vibration forces to which the tape transport unit is subjected.

The capstan 18 is driven by motor 16 via drive belt 20. Drive motor speed may be controlled in the conventional manner, using feedback from a tachometer mounted on the capstan. Tape driving power is transmitted from capstan 18 to the peripheral drive belt 22 and from belt 22 to the outermost layer of the tape 14 on each of reels 10 and 12. Power transmission is effected through the normal static frictional forces existing at the belt-capstan interface and at the belt-tape interfaces. The peripheral belt 22 is maintained under adequate tension at all times by means of the spring-loaded belt tensioning arm 36 and the roller 34 mounted thereon. The spring-loaded belt tensioning arm and associated roller also serve to compensate for small changes in the total linear distance around the belt path which occur with changing disposition of the total tape footage between the two reels. The belt-capstan and belt-tape interfacial friction forces are adequate to drive the tape without significant slippage, even during rapid start-stop operation.

Figure 2:
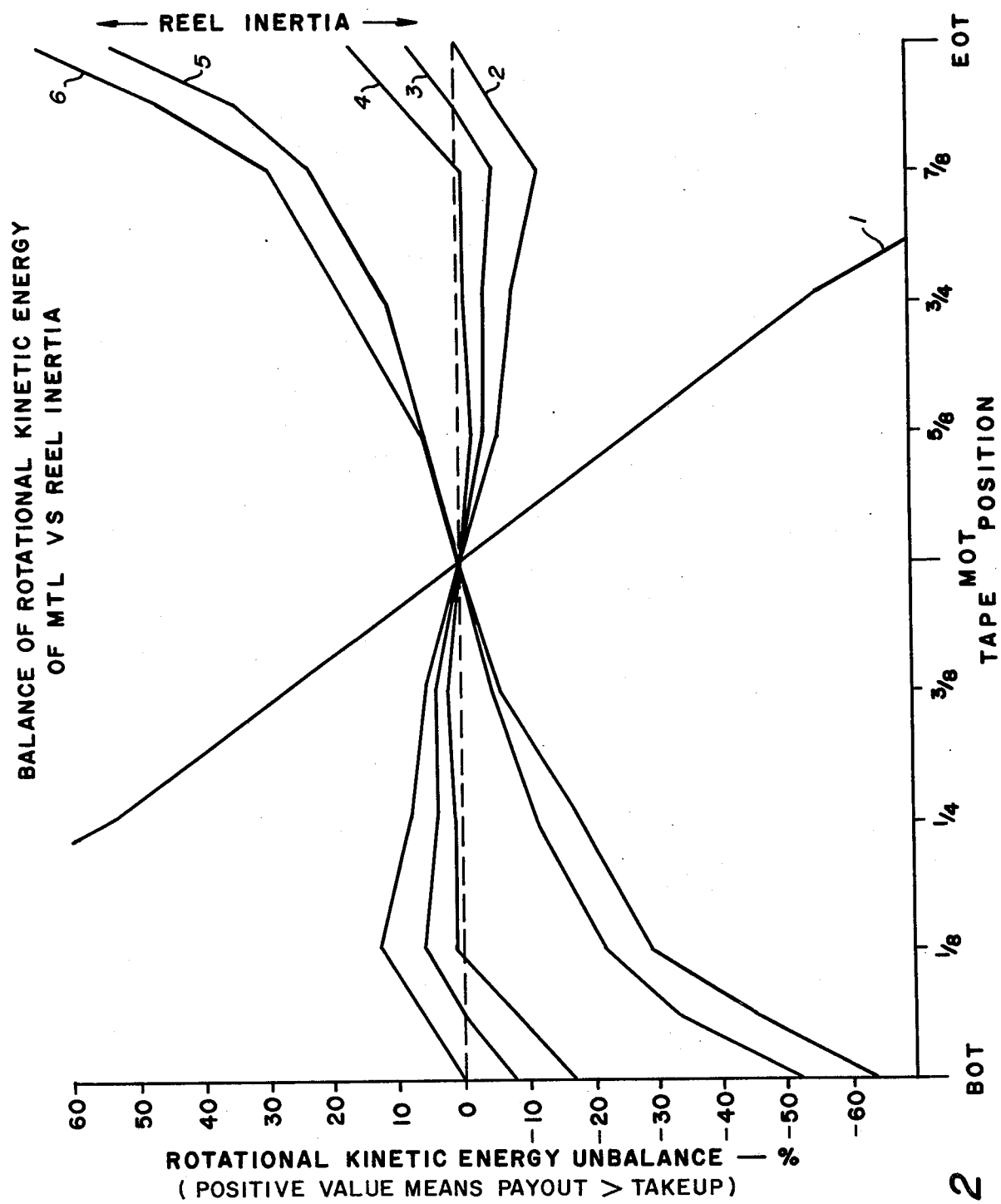
FIG. 2 is a graphical illustration of rotational kinetic energy of tape reels versus inertia of the reels.

Referring now to FIG. 2, an important feature of the present invention resides in optimizing the balance of the rotational kinetic energy of the two reels and tape packs with each other to a difference of less than 10% from beginning of tape to end of tape. This is accomplished by selecting the reel geometry which gives the reel inertia which produces the optimum balance of rotational kinetic energy of both reel and tape packs throughout the full transfer of tape from one reel to another. Lines 1–6 on FIG. 2 represent various reel inertias increasing from a minimum at line 1 (a hub with no flanges) to a maximum reel inertia for the reel configuration represented by line 6. The preferred configuration dictated by FIG. 2 would be line 3 which has the least maximum imbalance of rotational kinetic energy between reels and tape packs throughout full transfer of the tape from one reel to the other of less than 10%, —the least maximum imbalance of less than 10% over the entire range of operation being defined herein as optimum balance.

Reels 10 and 12 are effectivey coupled together by means of the peripheral drive belt 22. The elastic characteristics of belt 22 and temperature compensated brake 32 cooperate to apply an advancing torque moment to the take-up reel and simultaneously a retarding torque moment to the supply reel so as to impart the desired tension to tape 14. The tape transport is, of course, bidirectional with the take-up and supply reel functions being reversed merely by changing the polarity of the voltage applied to drive motor 16.

The single capstan peripheral drive of the present invention has a number of important novel features. In accordance with one of these features the two tape reels are tightly coupled together, in such a manner that the supply reel cannot be accelerated more rapidly than the take-up reel and the take-up reel cannot be decelerated more rapidly than the supply reel. Thus, tape spillage is effectively prevented. This improved coupling is achieved through both the balanced kinetic energy of the tape reel packs and the constant peripheral tension provided by the tension arm assembly of arm 36, roller 34, counterweight 38 and spring 40. This tight coupling between the two tape reels exists at all times, even when all power is removed, in a tape transport in accordance with the present invention. Thus, one reel cannot rotate with respect to the other one when power is removed, even during shock, vibration and acceleration conditions. Hence there is no danger of tape spillage in the power-off condition.

Figure 4:
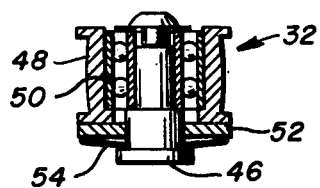
FIG. 4 is a sectional view along line 4—4 of FIG. 1 showing the details of the friction brake.

Rotary brake 32 introduces temperature compensation to the system to maintain desired tape tension over a wide temperature range. The temperature compensated rotary brake, which is shown in FIG. 4 has a shaft 46 which is mounted on base 11 with a pulley 48 rotatably mounted on shaft 46 by a ball bearing assembly 50. A friction disc 52 is positioned at the bottom of pulley 48 and a bimetallic spring 54 is positioned between friction disc 52 and a shoulder on shaft 46 to urge the friction disc against the bottom of pulley 48. The force of bimetallic spring 54 varies with temperature, so the braking effect disc 52 exerts on pulley 48 will vary as a function of temperature. Thus, the effects of temperature variations on the tape itself can be compensated by the rotary brake. By selecting the spring force to vary with temperature, the unit can be programmed to maintain a constant or any desired program of tape tension over a wide temperature range to maximize tape life.

The use of a temperature compensated rotary brake in the present invention may be contrasted with the prior art wherein it has been determined that a constant wrap angle of the drive belt around a drag brake is required in order to maintain constant tension on the tape. Such prior art configuration, such as illustrated in U.S. Pat. Nos. 3,620,473 and 3,974,982, require two idler pulleys to establish that constant wrap angle. The present invention permits elimination of one of those idler pulleys because it is not necessary to maintain a constant wrap angle of the drive belt around the rotary brake.

Figure 5:
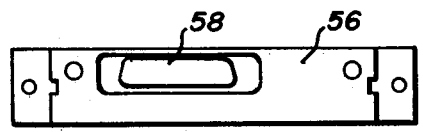
FIG. 5 is a rear elevation view of the tape cartridge unit.
Figure 6:
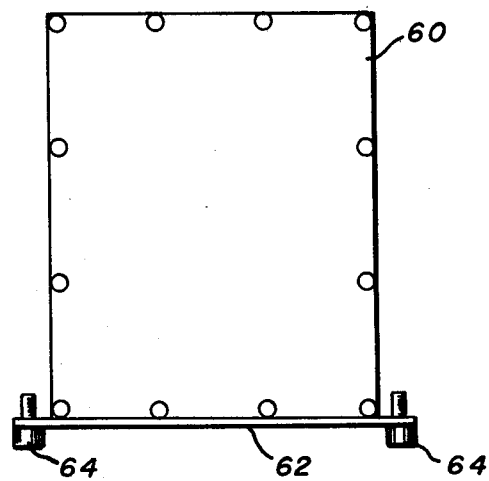
FIG. 6 is a top plan view of the tape cartridge unit.

Another novel feature of the present invention resides in the compact design which includes the drive motor 16 mounted on tape transport base 11. This compact design permits heremetic sealing of the tape transport as a compact, low profile cartridge unit where ony electrical communication must be made between the interior and exterior of the hermetic package. FIG. 5 shows a rear elevation view of the tape transport cartridge with the rear surface 56 having an electrical connector 58 thereon to deliver power within the unit. FIG. 6 shows the top cover 60 in place, with front plate 62 having fasteners 64 to mount the cartridge in any desired equipment.

While a preferred embodiment has been shown and described, various modifications and substitutions may be made thereto without departing from the spirit and scope of the invention. Accordingly, it will be understood that the present invention has been described by way of illustration and not limitation.

What is claimed is:

1. A tape transport including:
    a base for mounting tape transport elements;
    first and second tape transfer means of predetermined configurations rotatably mounted on said base for transfer of tape therebetween, the rotational kinetic energy of said first tape transfer means and the tape thereon and the rotational kinetic energy of said second tape transfer means and the tape thereon differing by less than a predetermined amount throughout all transfer of tape between said first and second tape transfer means;
    belt means for contacting the periphery of tape packs on each of said first and second tape transport means to transfer tape between said first and second tape transfer means;
    drive means for driving said belt means;
    tensioning means in contact with said belt means for imparting a desired tension to said belt means; and
    rotary brake means in contact with said belt means to impose a drag effect on said belt means for imparting desired tension to the tape being transferred between said first and second tape transfer means.

2. A tape transport as in claim 1 wherein said tensioning means includes:
    a rotatable idler wheel balance means for dynamcially balancing the tensioning means; and
    spring means for loading said idler wheel against said belt means.

3. A tape transport as in claim 2 wherein said balance means includes:
    an arm on which said idler wheel is rotatably mounted; and
    a counterwieght means on said arm, said spring means being connected between said arm and said base.

4. A tape transport as in claim 1 wherein said rotary brake means includes:
    temperature responsive means for varying the drag effect of said brake means as a function of temperature to obtain predetermined tape tension over a range of temperatures.

5. A tape transport as in claim 1 wherein said rotary brake means incudes:
    a rotatable wheel in contact with said belt means;
    a friction disc in contact with said rotary wheel; and
    temperature responsive spring means loading said disc against said wheel to very the drag effect of said wheel on said belt means to obtain predetermined tape tension over a range of temperatures.

6. A tape transport as in claim 1 wherein:
    the optimum balance of rotational kinetic energy of each tape transfer means and the tape thereon is the least maximum imbalance of rotational kinetic energy of each tape transfer means and tape thereon throughout transfer of tape from one tape transfer means to the other.

7. A tape transport as in claim 1 wherein:
    said drive means is mounted on said base; and further including:
    means for hermetically sealing said tape transport to form a sealed tape transfer cartridge.

8. A tape transport including:
    a base for mounting tape transport elements;
    first and second tape transfer means rotatably mounted on said base for transfer of tape therebetween;
    belt means for contacting the periphery of tape packs on each of said first and second tape transport means to transfer tape between said first and second tape transfer means;
    drive means for driving said belt means;
    dynamically balanced tensioning means in contact with said belt means for imparting a desired tension to said belt means; and
    temperature compensated rotary brake means in contact with said belt means to impose a variable drag effect on said belt means as a function of temperature for imparting desired tension to the tape being transferred between said first and second tape transfer means over a range of temperatures.

9. A tape transport as in claim 8 wherein said dynamically balanced tensioning means includes:
    a rotatable idler wheel;
    an arm on which said idler wheel is rotatably mounted;
    counterweight means on said arm; and
    spring means between said arm and said base to load said idler wheel against said drive belt.

10. A tape transport as in claim 8 wherein said brake means incudes:
    a rotatable wheel in contact with said belt means;
    a friction disc in contact with said rotary wheel; and
    temperature responsive spring means loading said disc against said wheel to vary the drag effect of said wheel on said belt means.

11. A tape transport as in claim 8 wherein:
    the rotational kinetic energy of each of said tape transfer means and the tape thereon differs from the other by less than a predetermined maximum amount throughout all transfer of tape between said first and second tape transfer means.

12. A tape transport as in claim 11 wherein:

the predetermined maximum difference between rotational kinetic energy of each tape transfer means and the tape thereon throughout transfer of tape from one tape transfer means to the other is less than 10%.

13. A tape transport as in claim 8 wherein:

said drive means is mounted on said base; and further including:

means for hermetically sealing said tape transport to form a sealed tape transfer cartridge.

14. A tape transport as in claim 1 wherein:

the predetermined maximum difference between the rotational kinetic energy of said first tape transfer means and the tape thereon and the rotational kinetic energy of said second tape transfer means and the tape thereon throughout all transfer of tape between said first and second tape transfer means is less than 10%.

15. A tape transport as in claim 14 wherein said tensioning means includes:

a rotatable idler wheel balance means for dynamically balancing the tensioning means; and spring means for loading said idler wheel against said belt means.

16. A tape transport as in claim 15 wherein said balance means includes:

an arm on which said idler wheel is rotatably mounted; and a counterweight means on said arm, said spring means being connected between said arm and said base.

17. A tape transport as in claim 14 wherein said rotary brake means includes:

temperature responsive means for varying the drag effect of said brake means as a function of temperature to obtain predetermined tape tension over a range of temperatures.

18. A tape transport as in claim 14 wherein said rotary brake means includes:

a rotatable wheel in contact with said belt means;

a friction disc in contact with said rotary wheel; and temperature responsive spring means loading said disc against said wheel to very the drag effect of said wheel on said belt means to obtain predetermined tape tension over a range of temperatures.

* * * * *